(12) United States Patent
Choi et al.

(10) Patent No.: US 12,280,641 B2
(45) Date of Patent: Apr. 22, 2025

(54) OUTER BELT INTEGRATED DOOR FOR VEHICLE

(71) Applicants: Hyundai Motor Company, Seoul (KR); Kia Corporation, Seoul (KR)

(72) Inventors: Je-Won Choi, Anyang-Si (KR); Dae-Chul Kim, Seongnam-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/202,202

(22) Filed: May 25, 2023

(65) Prior Publication Data

US 2024/0083227 A1 Mar. 14, 2024

(30) Foreign Application Priority Data

Sep. 14, 2022 (KR) .................. 10-2022-0115714

(51) Int. Cl.
*B60J 10/76* (2016.01)
*B60J 10/15* (2016.01)
*B60J 10/36* (2016.01)

(52) U.S. Cl.
CPC .............. *B60J 10/76* (2016.02); *B60J 10/15* (2016.02); *B60J 10/36* (2016.02)

(58) Field of Classification Search
CPC ... B60J 10/76; B60J 10/15; B60J 10/36; B60J 10/75
USPC .................................... 49/374, 377
See application file for complete search history.

(56) References Cited

U.S. PATENT DOCUMENTS

| | | | | |
|---|---|---|---|---|
| 3,908,312 A | * | 9/1975 | Pennec | B60J 10/265 49/493.1 |
| 4,442,634 A | * | 4/1984 | Kimura | B60J 10/17 49/377 |
| 4,696,128 A | * | 9/1987 | Fukuhara | B60J 10/265 49/492.1 |
| 4,860,494 A | * | 8/1989 | Fujii | B60J 10/75 49/377 |
| 5,085,005 A | * | 2/1992 | Yasukawa | B60J 10/244 15/250.1 |
| 5,170,586 A | * | 12/1992 | Ose | B60J 10/265 49/377 |
| 5,199,760 A | * | 4/1993 | Vering | B60J 10/75 49/377 |
| 5,463,831 A | * | 11/1995 | Shinagawa | B60J 10/75 49/377 |
| 5,740,640 A | * | 4/1998 | Yasuda | B60J 10/265 52/204.597 |

(Continued)

FOREIGN PATENT DOCUMENTS

| | | | | |
|---|---|---|---|---|
| DE | 102005022582 A1 | * | 11/2006 | ............... B60J 10/75 |
| JP | 11115491 A | * | 4/1999 | ............... B60J 10/75 |

(Continued)

*Primary Examiner* — Jerry E Redman
(74) *Attorney, Agent, or Firm* — Morgan, Lewis & Bockius LLP

(57) ABSTRACT

An outer belt integrated door for a vehicle including an external panel, an internal panel fastened to an internal surface of the external panel, and a door glass provided between the external panel and the internal panel includes a coupling block portion provided on an upper internal surface of the external panel and a hidden lip coupled to the coupling block portion and configured to seal between the external panel and the door glass.

19 Claims, 8 Drawing Sheets

(56) References Cited

U.S. PATENT DOCUMENTS

| | | | | |
|---|---|---|---|---|
| 5,815,985 A * | 10/1998 | Nishida | ................ | B60J 10/265 49/377 |
| 6,070,363 A * | 6/2000 | Vance | ................ | B60J 10/75 49/377 |
| 6,119,406 A * | 9/2000 | Gulisano | ................ | B60R 13/0243 49/502 |
| 8,104,227 B2 * | 1/2012 | Tamura | ................ | B60J 10/75 49/377 |
| 8,549,790 B2 * | 10/2013 | Murree | ................ | B60J 10/75 49/377 |
| 8,789,313 B2 * | 7/2014 | Roll | ................ | B60J 10/75 49/377 |
| 9,003,709 B2 * | 4/2015 | Patterson | ................ | B60J 10/36 49/377 |
| 11,110,783 B2 * | 9/2021 | Sävström | ................ | B60J 10/75 |
| 2008/0034664 A1 * | 2/2008 | Clark | ................ | B60J 10/32 49/377 |
| 2012/0261933 A1 * | 10/2012 | Sato | ................ | B60R 13/04 296/1.08 |
| 2014/0319869 A1 * | 10/2014 | Baskar | ................ | B60J 5/0423 296/146.6 |
| 2017/0028831 A1 * | 2/2017 | Yamada | ................ | B60J 1/2097 |
| 2020/0086725 A1 * | 3/2020 | Morioka | ................ | B60J 10/50 |
| 2024/0083227 A1 * | 3/2024 | Choi | ................ | B60J 10/15 |

FOREIGN PATENT DOCUMENTS

| | | | | |
|---|---|---|---|---|
| JP | 2003118386 A * | 4/2003 | ................ | B10J 10/75 |
| JP | 2004249745 A * | 9/2004 | ................ | B60J 10/75 |
| KR | 10-2016-0118579 A | 10/2016 | | |
| WO | WO-2012176324 A1 * | 12/2012 | ................ | B60J 10/20 |
| WO | WO-2014034220 A1 * | 3/2014 | ................ | B60J 10/70 |
| WO | WO-2016052388 A1 * | 4/2016 | ................ | B60J 10/27 |

\* cited by examiner

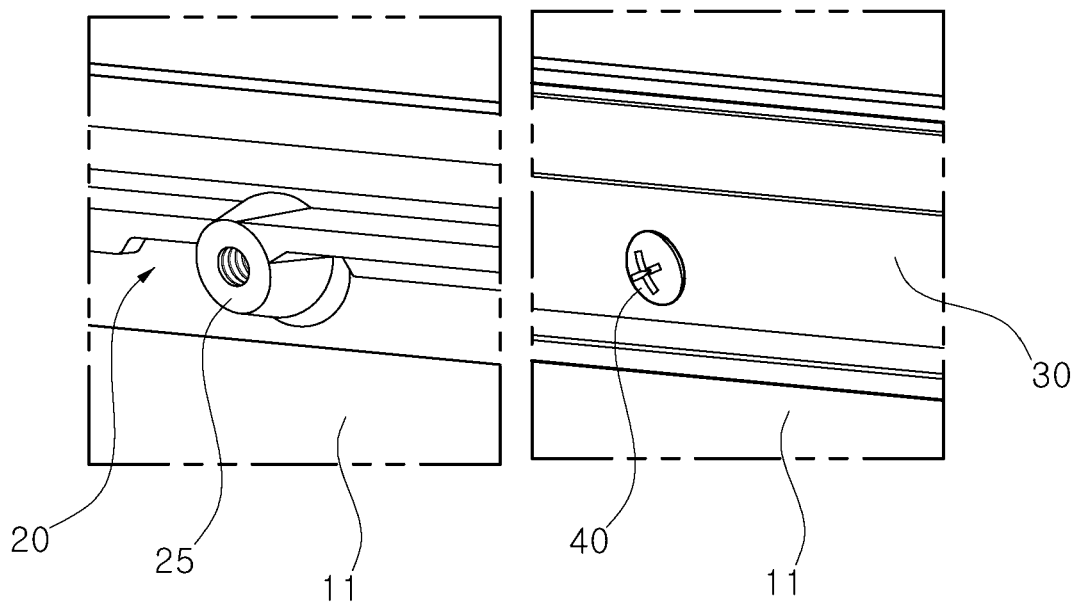

OUTER BELT INTEGRATED DOOR FOR VEHICLE

CROSS-REFERENCE TO RELATED APPLICATION

The present application claims priority to Korean Patent Application No. 10-2022-0115714, filed on Sep. 14, 2022, the entire contents of which is incorporated herein for all purposes by this reference.

BACKGROUND OF THE PRESENT DISCLOSURE

Field of the Present Disclosure

The present disclosure relates to an outer belt integrated door for a vehicle in which an outer belt is not exposed to the outside and can provide required airtight performance while improving appearance.

Description of Related Art

As shown in FIG. 1, a side of a vehicle 100 is typically provided with a door 110 for passengers to get on or off.

The door 110 is formed by bonding an external panel 111 and an internal panel to each other, and a door glass 113 is installed therebetween. An outer belt rail 120 is provided on an upper end of the external panel 111 to cover a hemming portion formed on the upper end of the external panel 111 and reinforce the stiffness of the upper end of the external panel 111.

An outer belt molding 130 and an in belt molding 140 for sealing the door glass 113 are mounted on the external panel 111 and the internal panel, respectively. The outer belt molding 130 includes an insert 131 for allowing the outer belt molding 130 to maintain a constant shape, an exposure portion 132 exposed to a side surface of the vehicle, an internal clip 133 fixed to the outer belt rail 120, and a molding lip 134 for sealing. The molding lip 134 made of a rubber material is formed at the outside of the insert 131 by injection, and the molding lip 134 extends to the door glass 113, providing airtightness therebetween. Furthermore, the molding lip 134 is attached to an internal surface of the exposure portion 132 and an external surface of the internal clip 133 so that the outer belt molding 130 is formed in a single member.

Meanwhile, because the exposure portion 132 is exposed to the side surface of the vehicle 100, the outer belt molding 130 becomes one of factors for determining a design of the side surface of the vehicle 100.

Due to minimalism, the recent design trend is designed to eliminate edges. Because the outer belt molding 130 also corresponds to the edge of the external panel 111 in the door 110, there is a demand for a design in which the outer belt molding 130 is minimized. The outer belt molding 130 is a component that needs to be applied to prevent the introduction of foreign substances, external noise, and moisture and is an essential portion of the door 110. Therefore, the exposure portion 132 is designed to include a smaller height h.

The outer belt molding 130 needs to sufficiently secure sealing performance. Because the external panel 111 is not integrated with the outer belt molding 130 but assembled to the outer belt molding 130, there is a problem of not providing a required airtightness performance due to a manufacturing distribution of each component and an assembling distribution occurring when the outer belt molding 130 and the external panel 111 are assembled.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an outer belt integrated door for a vehicle, which includes a coupling block portion provided on an upper internal surface of an external panel and a hidden lip coupled to the coupling block portion.

An outer belt integrated door for a vehicle according to an exemplary embodiment of the present disclosure including an external panel, an internal panel assembled to an internal surface of the external panel, and a door glass provided between the external panel and the internal panel may include a coupling block portion provided on an upper internal surface of the external panel and a hidden lip coupled to the coupling block portion in a transverse direction of the vehicle and configured to seal a portion between the external panel and the door glass.

The coupling block portion may include a lower rib, which extends toward the hidden lip and is formed with a locking portion formed on an internal surface thereof, the hidden lip may include a locking protrusion caught and fixed to the locking portion, and the locking protrusion may be caught to the locking portion, and thus the hidden lip may be coupled to the coupling block portion.

The coupling block portion may extend in a height direction of the vehicle.

A body may be formed on the hidden lip in a height direction of the vehicle, a protrusion extending from the body toward the coupling block portion in the transverse direction of the vehicle may be formed, and the locking protrusion may be formed on an end portion of the protrusion.

The locking portion may be formed at an interval in a longitudinal direction of the vehicle.

An upper rib protruding toward the hidden lip in the transverse direction of the vehicle above the lower rib may be formed on the coupling block portion.

An insertion protrusion protruding from the body formed in the height direction of the vehicle toward the coupling block portion may be formed on the hidden lip, and the insertion protrusion may be inserted between the upper rib and the lower rib.

An upper support in contact with and supported by the coupling block portion on an upper end portion of the body may be formed on the hidden lip, and an upper contact portion whose upper end portion is in contact with the upper support may be formed on the coupling block portion.

A lower support extending downwardly from the end portion of the protrusion may be formed on the hidden lip, and a touch boss in contact with the lower support may be formed on the coupling block portion.

Each of an upper sealing and a lower sealing protruding from the body toward the door glass and in contact with and sealing the door glass may be formed on the hidden lip at an interval in the height direction of the vehicle.

The hidden lip may be formed in a predetermined cross section in a longitudinal direction of the vehicle.

A coupling portion including a screw thread formed therein may be formed on the coupling block portion, and a fastening bolt passes through the hidden lip and may be screw-coupled to the coupling portion, and thus the coupling block portion may be fastened to the hidden lip.

The external panel and the coupling block portion may be integrally formed.

The external panel may be made of a plastic composite material, and the internal panel may be formed as a metal panel.

The external panel and the internal panel may be made of the same material.

To limit the movement of the hidden lip in a longitudinal direction of the vehicle, a stopper protruding from the internal surface of the external panel may be formed on the internal surface of the external panel.

According to the outer belt integrated door for a vehicle according to an exemplary embodiment of the present disclosure including the above configuration, it is possible to integrally form the outer belt to the upper end portion of the external panel of the door, implementing the design that reflects the recent trend. It is possible to implement the design skin shape from the external panel to the uppermost end portion.

Furthermore, because the outer belt assembled as the separate element is deleted, it is possible to reduce the manufacturing distribution of each component and the assembling distribution occurring when the external panel and the outer belt are assembled, improving quality.

Furthermore, it is possible to delete the outer belt, reducing the number of components and saving the cost.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 7 is a partially enlarged perspective view showing a state in which a fastening portion for bolting is formed on the coupling block portion in the outer belt integrated door for a vehicle according to an exemplary embodiment of the present disclosure.

FIG. 8 is a partially enlarged perspective view showing a state in which the hidden lip is fastened by a fastening bolt in the outer belt integrated door for a vehicle according to an exemplary embodiment of the present disclosure.

Figure 1:
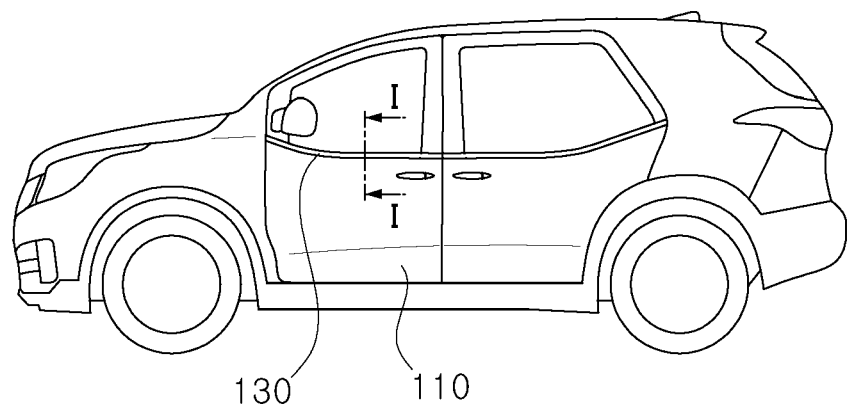
FIG. 1 is a side view of a typical vehicle in a related art.
Figure 2:
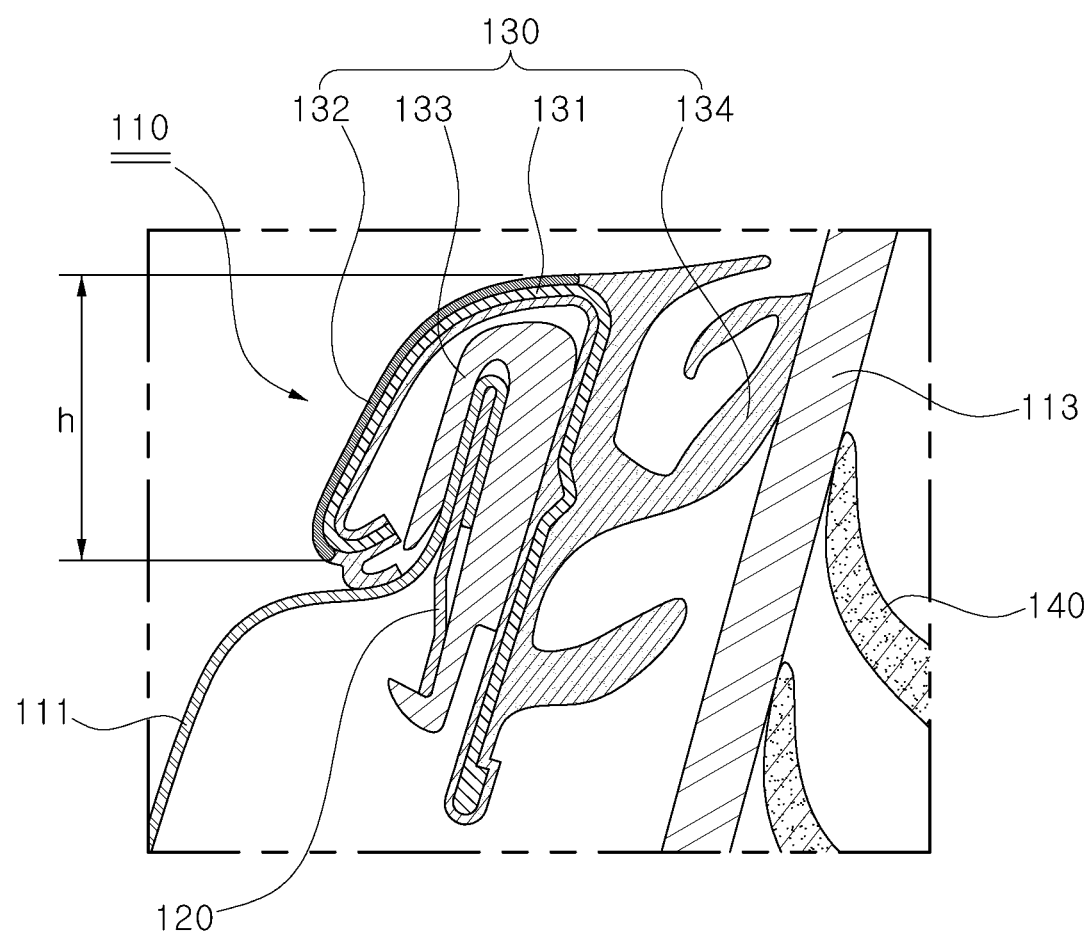
FIG. 2 is a cross-sectional view along line I-I in FIG. 1.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, an outer belt integrated door for a vehicle according to an exemplary embodiment of the present disclosure will be described in detail with reference to the accompanying drawings.

An outer belt integrated door 10 for a vehicle according to an exemplary embodiment of the present disclosure including an external panel 11, an internal panel 12 assembled to an internal surface of the external panel 11, and a door glass 13 provided between the external panel 11 and the internal panel 12 may include a coupling block portion 20 provided on an upper internal surface of the external panel 11 and a hidden lip 30 coupled to the coupling block portion 20 for sealing a portion between the external panel 11 and the door glass 13.

The door 10 for a vehicle includes the external panel 11 and the internal panel 12 and is formed by bonding respective circumferences of the external panel 11 and the internal panel 12.

Any one of the external panel 11 and the internal panel 12 may be formed as a plastic panel, and the other may be formed as a metal panel. For example, by manufacturing the external panel 11 with the plastic panel, it is possible to easily respond to design changes of the door 10 while achieving weight loss.

The external panel 11 may be made of a plastic composite material which may be molded by injection, and thus by responding to the design change by modifying a mold for injection when the design of the vehicle is changed, it is possible to easily respond to the changed design as compared to when both of the external panel 11 and the internal panel 12 are formed as the metal panel.

Figure 3:
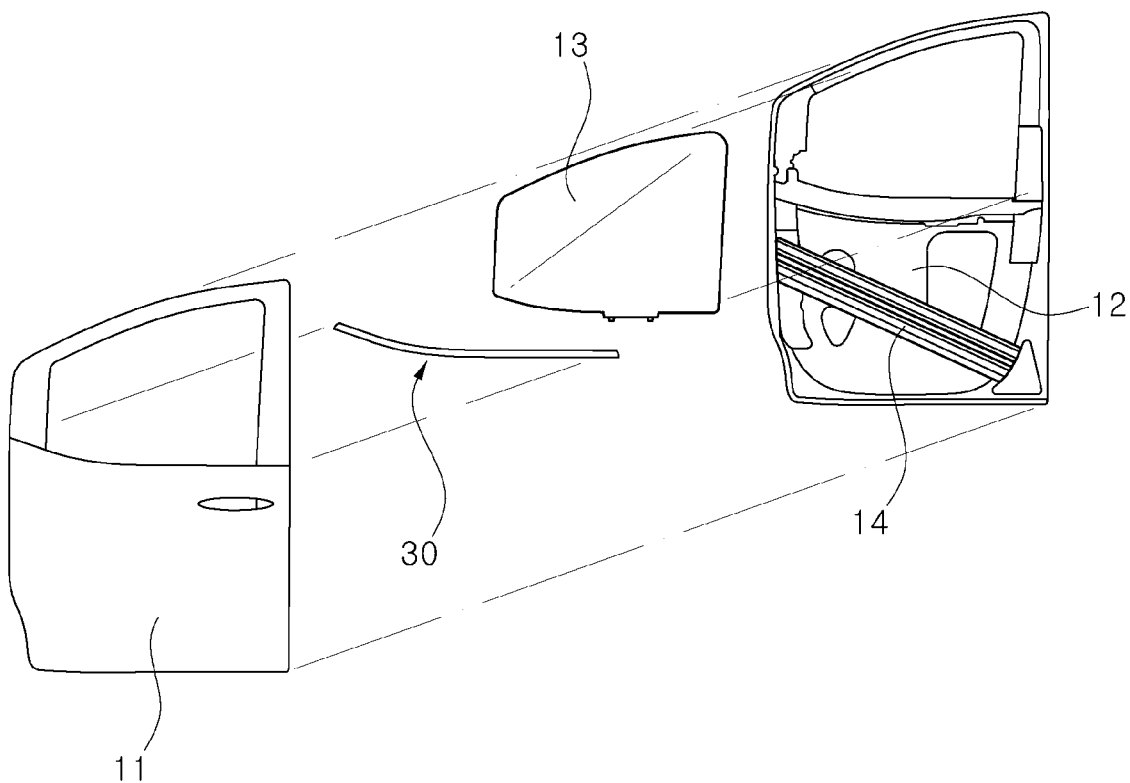
FIG. 3 is an exploded perspective view of an outer belt integrated door for a vehicle according to an exemplary embodiment of the present disclosure.

When the external panel 11 may be made of the plastic composite material, a stiffness auxiliary member, such as an impact beam 14, may be applied to the inside of the internal panel 12 as shown in FIG. 3.

In an exemplary embodiment of the present disclosure, the hidden lip 30 configured as an outer belt molding may be provided between the external panel 11 and the door glass 13 so that the outer belt molding is not exposed to the upper end portion of the external panel 11, and the coupling block portion 20 coupled to the hidden lip 30 is formed on the internal surface of the external panel 11.

The coupling block portion 20 may be formed on the upper end portion of the external panel 11 in a structure which is open in a width direction of the door 10 and is provided on an uppermost internal surface of the external panel 11.

The coupling block portion 20 may be bonded to the external panel 11 or formed together when the external panel 11 is molded, and thus the coupling block portion 20 may be formed integrally with the external panel 11. When the coupling block portion 20 is formed integrally with the external panel 11, the coupling block portion 20 may be made of the same material as the external panel 11, and the coupling block portion 20 may be also molded at the same time when the external panel 11 is molded.

When viewed from the side of the vehicle, because the vehicle needs to be designed so that only the external panel 11 is visible, an upper end portion of the coupling block portion 20 may be positioned to be equal to or lower than the upper end portion of the external panel 11.

The coupling block portion 20 may include an upper contact portion 21 positioned on an uppermost end portion of the coupling block portion 20, an upper rib 22 and a lower rib 24 each extending in the width direction of the vehicle under the upper contact portion 21, and a touch boss 25 positioned at a lower side of the coupling block portion 20.

The hidden lip 30 may be coupled to the coupling block portion 20 to seal a portion between the external panel 11 and the door glass 13. The hidden lip 30 may be coupled to the coupling block portion 20 so that an external surface of the door glass 13 is sealed.

The hidden lip 30 may include a body 31 extending in a height direction of the vehicle, an upper support 32 formed on an upper end portion of the body 31 and in contact with and supporting the upper contact portion 21, an insertion protrusion 33 inserted between the upper rib 22 and the lower rib 24, a locking protrusion 35 coupled to the lower rib 24, a lower support 36 in contact with and supporting the touch boss 25, and a protrusion 34 protruding from the body 31 to form the locking protrusion 35 and the lower support 36. Because the hidden lip 30 is manufactured through extrusion, the hidden lip 30 may be formed in a constant or predetermined cross section in a longitudinal direction of the vehicle.

When viewed from the side surface of the vehicle, because the vehicle needs to be designed so that only the external panel 11 is visible, the upper end portion of the hidden lip 30 may be also positioned to be equal to or lower than the upper end portion of the external panel 11.

For sealing, the hidden lip 30 may be made of synthetic rubber, for example, ethylene propylene diene monomer (EPDM).

A locking portion 24a is formed on the lower rib 24, by locking the locking protrusion 35 to the locking portion 24a, the hidden lip 30 may be coupled to the coupling block portion 20. The coupling block portion 20 may include the lower rib 24 extending in the width direction of the vehicle toward the hidden lip 30 formed on an internal surface thereof, and the locking portion 24a extending in the height direction of the vehicle is formed on an end portion of the lower rib 24. Furthermore, the protrusion 34 extending in the width direction of the vehicle from the body 31 toward the coupling block portion 20 may be formed on the hidden lip 30 and the locking protrusion 35 caught and fixed to the locking portion 24a may be formed on an end portion of the protrusion 34. The locking protrusion 35 may be engaged to the locking portion 24a, and thus the hidden lip 30 may be coupled to the coupling block portion 20.

Figure 4A:
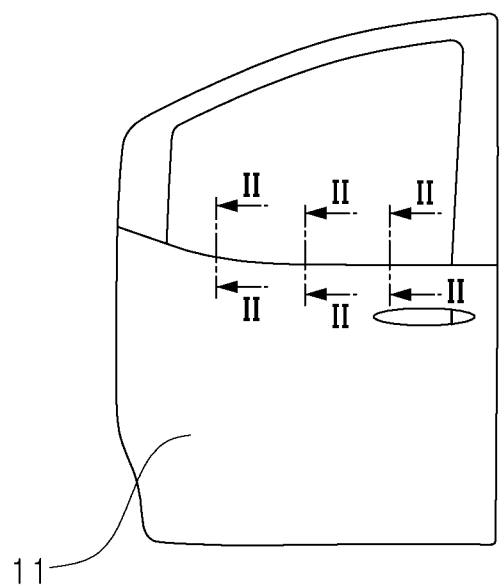
FIG. 4A and FIG. 4B are a side view and a cross-sectional view showing a portion where a coupling block portion and a hidden lip are fastened on an upper end portion of the outer belt integrated door for a vehicle according to an exemplary embodiment of the present disclosure, respectively.
Figure 5:
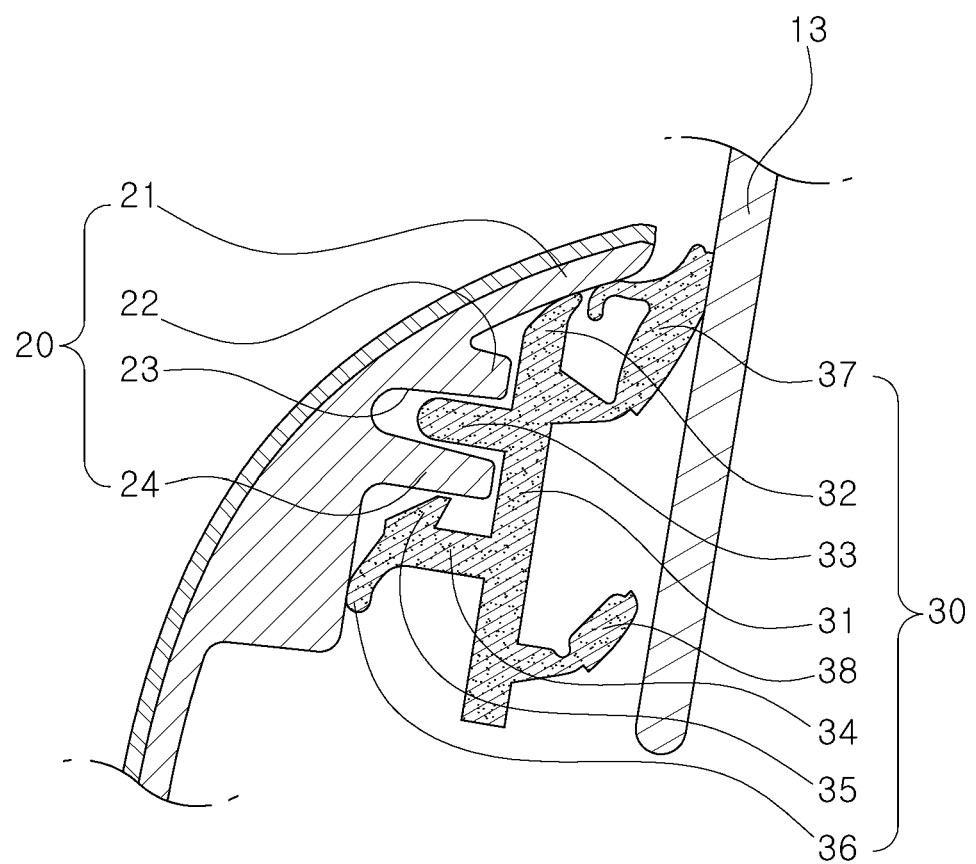
FIG. 5 is a cross-sectional view showing the remaining portions except for the portion where the coupling block portion and the hidden lip are fastened on the upper end portion of the outer belt integrated door for a vehicle according to an exemplary embodiment of the present disclosure.

However, the locking portion 24a may not be formed in the entire section of the coupling block portion 20, but may be only in a partial section. In other words, by forming the locking portion 24a on a portion indicated by line II-II in FIG. 4A, the locking portion 24a may be formed at an interval in the longitudinal direction of the vehicle. On portions other than the portion indicated by line II-II, as shown in FIG. 5, the lower rib 24 may be formed on the coupling block portion 20, but the locking portion 24a may not be formed thereon. This is to easily remove the coupling block portion 20 from a mold after the molding process.

Figure 4B:
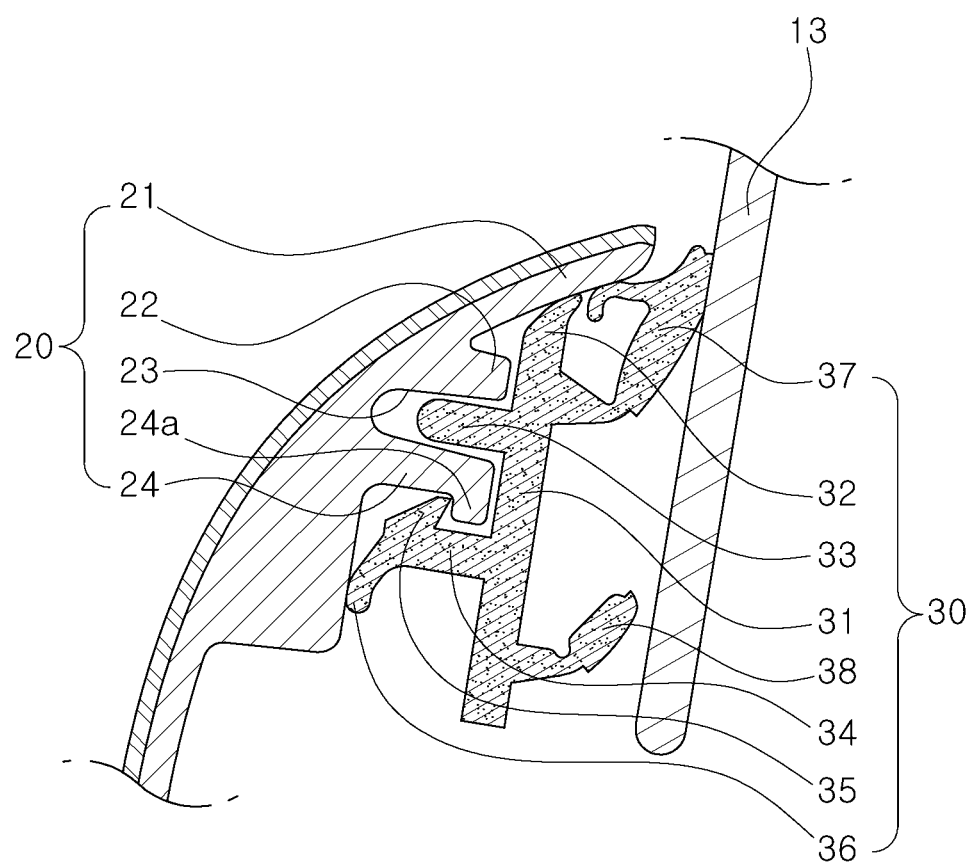

Of course, the locking portion 24a as shown in FIG. 4B may also be formed in the entire section of the coupling block portion 20. In the instant case, the coupling block portion 20 may be formed to have a constant shape with respect to the longitudinal direction of the vehicle.

The upper rib 22 protruding in the width direction of the vehicle toward the hidden lip 30 above the lower rib 24 may be formed on the coupling block portion 20. The insertion protrusion 33 protruding toward the coupling block portion 20 above the protrusion 34 may be formed on the hidden lip 30. The insertion protrusion 33 may be inserted into an insertion groove 23 formed between the upper rib 22 and the lower rib 24. The insertion protrusion 33 may be inserted between the upper rib 22 and the lower rib 24 to limit the movement of the hidden lip 30 in the height direction of the vehicle with respect to the coupling block portion 20.

The upper contact portion 21 whose upper end portion is in contact with the upper end portion of the hidden lip 30 may be formed on the coupling block portion 20. The hidden lip 30 includes the upper support 32 in contact with and supporting the upper contact portion 21 formed on the upper end portion of the body 31.

Furthermore, a lower end portion of the hidden lip 30 may be in contact with and supported by the touch boss 25. In other words, the lower support 36 extending downwardly from the end portion of the protrusion 34 may be formed on the hidden lip 30, and the touch boss 25 in contact with the lower support 36 may be formed on the coupling block portion 20. The locking protrusion 35 and the lower support 36 are respectively formed above and under the end portion of the protrusion 34.

In the hidden lip 30, because the upper support 32 and the lower support 36 are respectively in contact with an upper end surface and the touch boss 25, each of the upper and lower end portions of the hidden lip 30 may be supported by the coupling block portion 20, limiting the rotation of the hidden lip 30.

Furthermore, when the upper rib 22 and the lower rib 24 of the coupling block portion 20 are in contact with the body 31 of the hidden lip 30, the movement of the hidden lip 30 in the width direction of the vehicle may be limited.

An upper sealing 37 and a lower sealing 38 protruding from the body 31 toward the door glass 13 may be formed on the hidden lip 30, respectively. Because each of the upper sealing 37 and the lower sealing 38 is formed at an interval in the height direction of the vehicle, the upper sealing 37 and the lower sealing 38 respectively seal an external surface of the glass 13 on upper and lower portions of the hidden lip 30.

Figure 6:
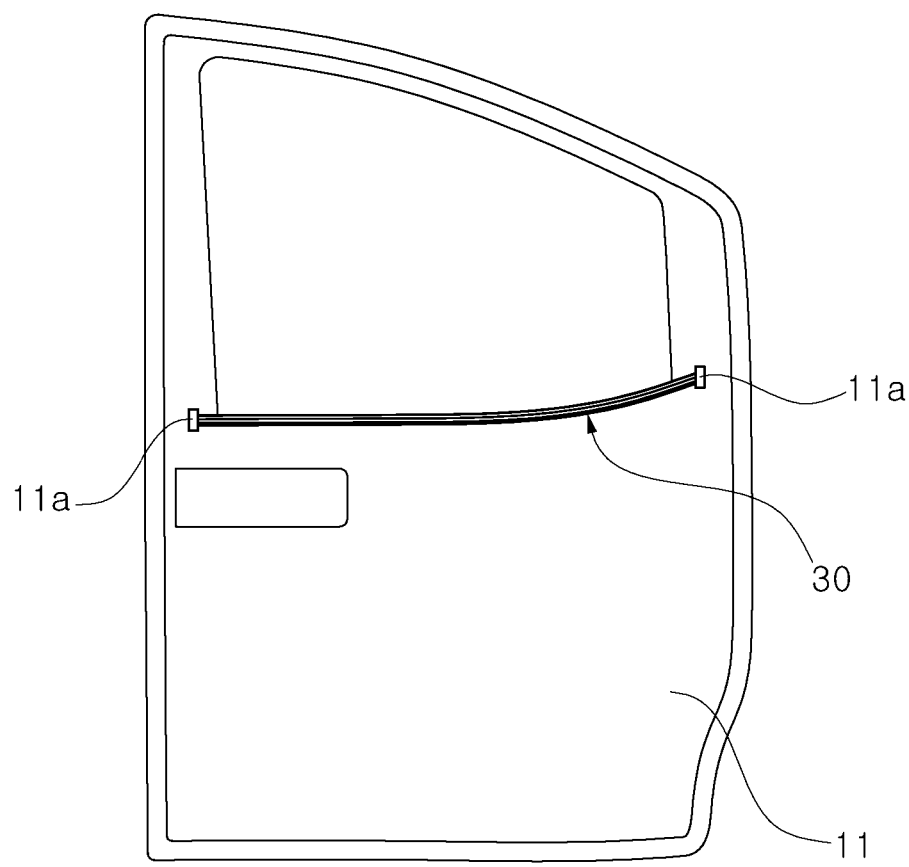
FIG. 6 is a side view showing a state in which the movement of the hidden lip of the external panel is limited by a stopper in the outer belt integrated door for a vehicle according to an exemplary embodiment of the present disclosure.

Meanwhile, to limit the movement of the hidden lip 30 in the longitudinal direction of the vehicle, a stopper 11a protruding from the internal surface of the external panel 11 may be formed as shown in FIG. 6. The stopper 11a may protrude from the external panel 11 and restrain the front and rear end portions of the hidden lip 30 coupled to the coupling block portion 20, restricting the movement of the hidden lip 30 in the longitudinal direction thereof.

FIG. 7 and FIG. 8 show a configuration in which the coupling block portion 20 and the hidden lip 30 may be additionally coupled by use of a fastening bolt 40.

A coupling portion 26 including a screw thread formed therein may be formed on the coupling block portion 20, the hidden lip 30 may be coupled by the above-described structure, and then the fastening bolt 40 may pass through the hidden lip 30 and may be screw-coupled to the coupling portion 26.

Therefore, the hidden lip 30 may be firmly fastened to the coupling block portion 20.

In the instant case, the coupling portion 26 may be formed on the coupling block portion 20 at an interval in the longitudinal direction of the vehicle, and the fastening bolt 40 may be fastened to each coupling portion 26.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An outer belt integrated door for a vehicle including an external panel, an internal panel fastened to an internal surface of the external panel, and a door glass provided between the external panel and the internal panel, the outer integrated door comprising:
    a coupling block portion provided on an upper internal surface of the external panel; and
    a hidden lip coupled to the coupling block portion in a transverse direction of the vehicle and configured to seal a portion between the external panel and the door glass,
    wherein the external panel integrally formed with the coupling block portion on the upper internal surface thereof extends to and cover an upper portion of the hidden lip,
    wherein the hidden lip further includes:
        a body formed in a height direction of the vehicle; and
        a protrusion extending from the body toward the coupling block portion in the transverse direction of the vehicle is formed, and
    wherein a locking protrusion is formed on an end portion of the protrusion.

2. The outer belt integrated door of claim 1,
    wherein the coupling block portion includes a lower rib, which extends toward the hidden lip and is formed with a locking portion formed on an internal surface thereof,
    wherein the hidden lip includes the locking protrusion caught and fixed to the locking portion, and
    wherein the hidden lip is coupled to the coupling block portion.

3. The outer belt integrated door of claim 2, wherein the coupling block portion extends in the height direction of the vehicle.

4. The outer belt integrated door of claim 2, wherein the locking portion is formed at an interval in a longitudinal direction of the vehicle.

5. The outer belt integrated door of claim 2, wherein the coupling block portion further includes an upper rib protruding toward the hidden lip in the transverse direction of the vehicle above the lower rib.

6. The outer belt integrated door of claim 5, wherein the hidden lip further incudes:
    an insertion protrusion protruding from a body formed in the height direction of the vehicle toward the coupling block portion,
    wherein the insertion protrusion is inserted between the upper rib and the lower rib.

7. The outer belt integrated door of claim 1, wherein the hidden lip further incudes:
    an upper support in contact with and supported by the coupling block portion on an upper end portion of the body, and
    wherein the coupling block portion further includes an upper contact portion, an upper end portion of which is in contact with the upper support.

8. The outer belt integrated door of claim 1,
    wherein the hidden lip further incudes a lower support extending downwardly from the end portion of the protrusion, and
    wherein the coupling block portion further includes a touch boss in contact with the lower support.

9. The outer belt integrated door of claim 1,
    wherein the hidden lip further incudes an upper sealing and a lower sealing,
    wherein each of the upper sealing and the lower sealing protruding from the body toward the door glass and in contact with and sealing the door glass is formed on the hidden lip at an interval in the height direction of the vehicle.

10. The outer belt integrated door of claim 1, wherein the hidden lip is formed in a predetermined cross section in a longitudinal direction of the vehicle.

11. The outer belt integrated door of claim 1,
    wherein a coupling portion including a screw thread formed therein is formed on the coupling block portion, and
    wherein a fastening bolt passes through the hidden lip and is screw-coupled to the coupling portion, and thus the coupling block portion is fastened to the hidden lip.

12. The outer belt integrated door of claim 1, wherein the external panel and the coupling block portion are integrally formed.

13. The outer belt integrated door of claim 1,
wherein the external panel is made of a plastic composite material, and
wherein the internal panel is formed as a metal panel.

14. The outer belt integrated door of claim 1, wherein the external panel and the internal panel are made of a same material.

15. The outer belt integrated door of claim 1, wherein to limit movement of the hidden lip in a longitudinal direction of the vehicle, a stopper protruding from the internal surface of the external panel is formed on the internal surface of the external panel.

16. The outer belt integrated door of claim 1, wherein the coupling block portion includes a constant shape with respect to a longitudinal direction of the vehicle in which a locking portion is formed in an entire section of the coupling block portion.

17. The outer belt integrated door of claim 1,
wherein the external panel is made of a metal panel, and
wherein the internal panel is made of a plastic composite material.

18. The outer belt integrated door of claim 1, wherein a stiffness auxiliary member is applied to an inner side of the internal panel.

19. The outer belt integrated door of claim 18, wherein the stiffness auxiliary member is an impact beam.

* * * * *